United States Patent [19]
Renegar et al.

[11] Patent Number: 5,216,898
[45] Date of Patent: Jun. 8, 1993

[54] COOLING APPARATUS

[75] Inventors: James G. Renegar, East Ridge, Tenn.; Malcolm L. Swanson, Chickamauga, Ga.

[73] Assignee: Astec Industries, Inc., Chattanooga, Tenn.

[21] Appl. No.: 820,350

[22] Filed: Jan. 14, 1992

[51] Int. Cl.5 .............................................. B01D 47/10
[52] U.S. Cl. ..................................... 62/314; 55/84; 55/222; 261/127; 239/132
[58] Field of Search .................. 62/304, 314; 55/83, 55/84, 222–228; 261/127; 239/132

[56] References Cited

U.S. PATENT DOCUMENTS

| | | | |
|---|---|---|---|
| 954,451 | 4/1910 | Merrell | 261/127 |
| 2,507,821 | 5/1950 | Sheward | 55/228 |
| 2,550,933 | 5/1951 | McEvoy | 239/132 |
| 3,269,826 | 8/1966 | Belkin | 239/132 |
| 3,461,682 | 8/1969 | Darby | 62/314 |
| 3,589,611 | 6/1971 | Jones | 239/132 |
| 3,704,570 | 12/1972 | Gardenier | 55/84 |
| 3,775,062 | 11/1973 | Susuki et al. | 23/285 |
| 3,782,074 | 1/1974 | Gardenier | 55/19 |
| 3,820,510 | 6/1974 | Vayssiere | 122/75 |
| 3,976,129 | 7/1976 | Silver | 165/154 |
| 4,078,503 | 3/1978 | von Dreusche, Jr. | 110/208 |
| 4,426,210 | 1/1984 | Drawert et al. | 55/73 |
| 4,740,981 | 4/1988 | Kleisle et al. | 372/59 |
| 4,934,607 | 6/1990 | Lasley | 239/132 |

OTHER PUBLICATIONS

Astec Industries, Inc., "Soil Purification System", 16 pages.

*Primary Examiner*—Albert J. Makay
*Assistant Examiner*—William C. Doerrler
*Attorney, Agent, or Firm*—Bell, Seltzer, Park & Gibson

[57] ABSTRACT

Cooling assemblies of the cooling apparatus each include an air atomizing spray nozzle located within a heated cooling chamber. An outer conduit interconnects the spray nozzle of each assembly and a source of cooling water. An inner conduit within the outer conduit interconnects the spray nozzle and a source of compressed air. Water passing through the outer conduit cools both it and the inner conduit. The outer conduit includes a flexible section that interconnects rigid sections and allows the latter to freely undergo differential expansive and contractive movement. Generally conical spray patterns produced by the spray nozzles form a circular array within the cooling chamber. Adjacent ones of the spray patterns abut each other and another nozzle spray pattern produced by a spray nozzle located generally centrally of the array and of the cooling chamber.

11 Claims, 2 Drawing Sheets

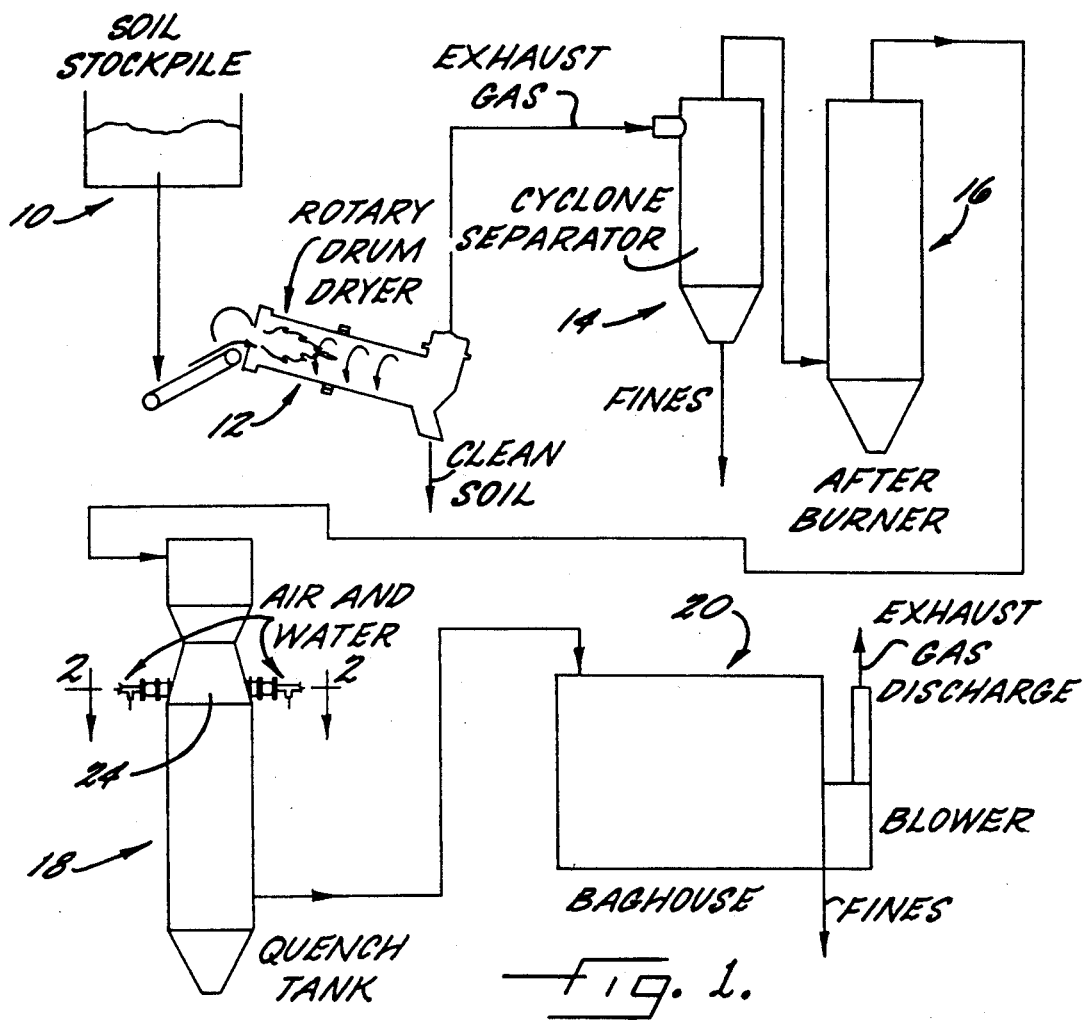
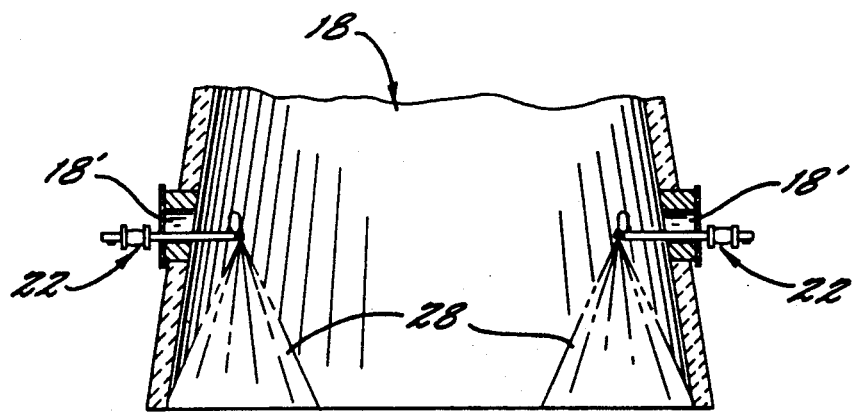

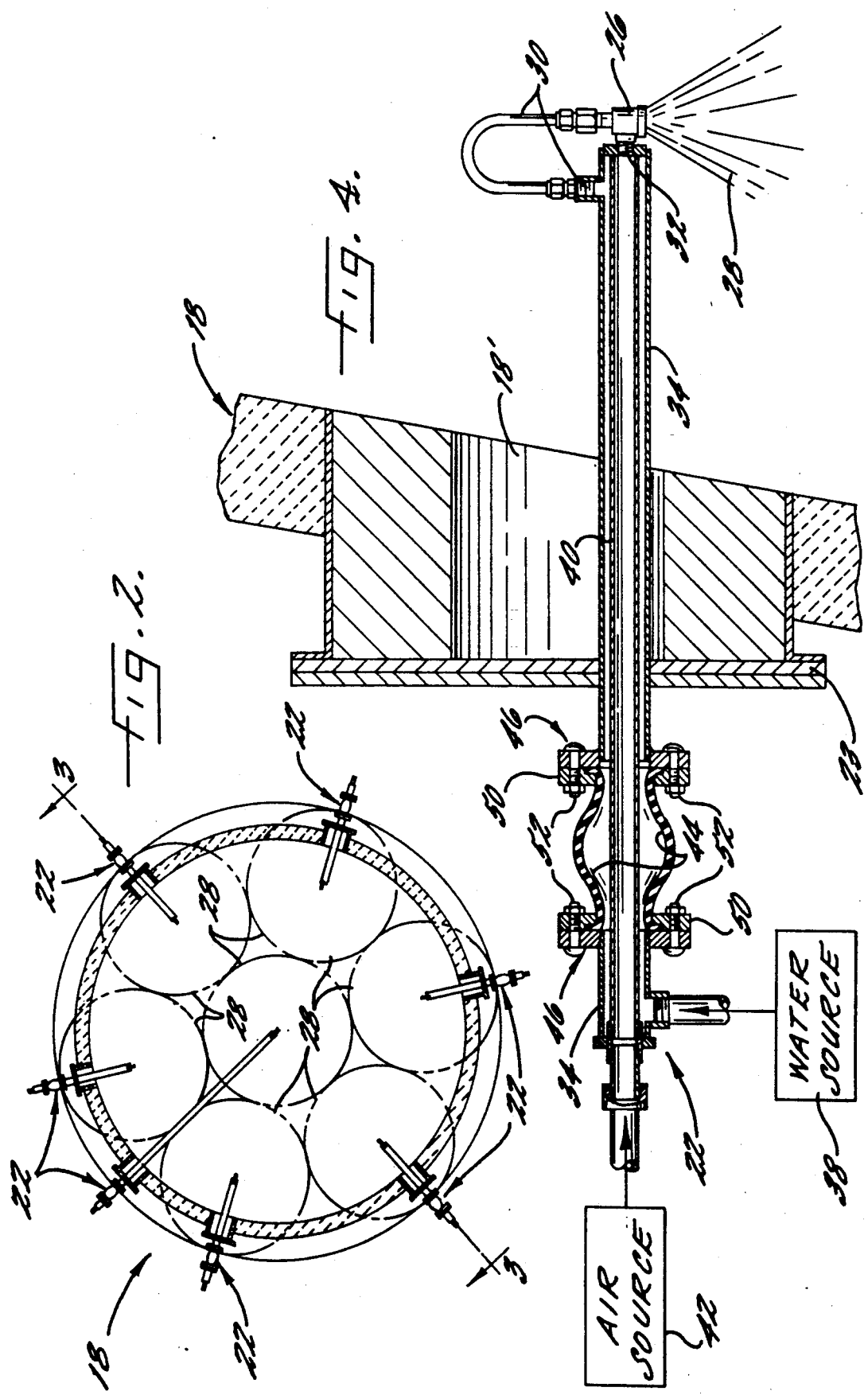

COOLING APPARATUS

FIELD OF THE INVENTION

This invention relates to apparatuses for cooling material, especially but not necessarily exclusively gaseous and particulate material, heated to elevated temperatures. The invention more specifically relates to an apparatus for introducing air atomized cooling water into a cooling chamber.

BACKGROUND OF THE INVENTION

Although also suitable for other applications, the apparatus of the present invention is particularly useful in a system for treating contaminated soil containing volatile organic compounds. Such a system typically includes a heated rotary drum dryer or similar primary treatment unit that receives the contaminated soil and heats the same to a temperature sufficient to vaporize and drive off moisture and the volatile organic compounds therein. The exhaust gases and particulate products of combustion discharged from the primary treatment unit are next conducted to a cyclone or similar separator which separates fines from the exhaust gases. The latter then pass to a secondary treatment unit wherein the exhaust gases are heated to approximately 1100°-1800° F. This converts the contaminants mainly into carbon dioxide and water by high temperature oxidation. The gases discharged from the secondary treatment unit pass into a cooling chamber, wherein they are cooled, and thereafter into a baghouse wherein additional particulate matter is filtered from the gases before they are discharged into the atmosphere. Efficient utilization of a system of the foregoing type requires, among other things, that cooling of the extremely hot gases introduced into the cooling chamber be accomplished rapidly and reliably, notwithstanding the hostile high-temperature environment present within such chamber.

DESCRIPTION OF THE PRIOR ART

The following U.S. patents may be of interest relative to the present invention: U.S. Pat. Nos. 3,704,570, 3,775,062, 3,782,074, 3,820,510, 3,976,129, 4,078,503, 4,426,210 and 4,740,981.

SUMMARY OF THE INVENTION

The present invention provides a highly durable apparatus for reliably and efficiently cooling high temperature gaseous and/or particulate matter within a cooling chamber. The apparatus comprises at least one cooling assembly having a spray nozzle that is located within the cooling chamber and that during operation of the apparatus sprays air atomized cooling water into the chamber. The apparatus further includes sources of water and compressed air outside of the chamber, an outer conduit interconnecting the water source and the spray nozzle, and an inner conduit that is located within and extends longitudinally of the outer conduit and interconnects the compressed air source and the spray nozzle. The inner conduit is contacted and cooled by the water passing through the outer conduit, which increases the useful life of the inner conduit. The outer conduit preferably includes a flexible section which interconnects and accommodates thermal expansion and contraction of thereto adjacent rigid sections of the outer conduit. In a preferred embodiment of the apparatus a plurality of the spray nozzles define a circular array within the cooling chamber, and an additional one of the spray nozzles is located centrally of such array.

DESCRIPTION OF THE DRAWINGS

Other features of the invention will be apparent from the following description of an illustrative embodiment thereof, which should be read in conjunction with the accompanying drawings, in which:

FIG. 1 is a schematic illustration of a system, illustratively for decontaminating soil, having a cooling chamber and associated cooling apparatus in accordance with the invention;

FIG. 2 (sheet 2) is a view partially in vertical section and partially in top plan taken substantially along the line and in the direction of the arrows 2—2 through the cooling chamber of FIG. 1;

FIG. 3 is a fragmentary vertical sectional view taken along the line 3—3 through the cooling chamber of FIG. 1 and showing in side elevation two of the spray nozzles and adjacent components of the cooling apparatus; and FIG. 4 is an enlarged fragmentary vertical sectional view of part of the cooling chamber and of one of the cooling assemblies of the cooling apparatus.

DESCRIPTION OF THE ILLUSTRATED EMBODIMENT

FIG. 1 of the drawings diagrammatically illustrates a system for treating soil contaminated with volatile organic compounds. Such system includes a soil stock pile 10, and a primary treatment unit 12, illustratively in the form of a heated rotary drum dryer, that receives soil from stock pile 10 and heats the same to a temperature sufficient to vaporize and drive off volatile organic compounds and moisture therein. The vaporized volatile organic compounds, water vapor and products of combustion exhausted from unit 12 pass to a cyclone separator 14 which removes entrained particulate matter. The exhaust gases are then conducted to a secondary after-burner treatment unit 16 wherein they are heated to approximately 1100°-1800° F. (depending on the type of contaminants), and are converted by high temperature oxidation into mainly carbon dioxide and water. The extremely hot gases discharged from unit 16 pass into and downwardly through a vertical cooling chamber 18. After cooling thereof in chamber 18 the cooled gases are conducted from such chamber to a baghouse 20 wherein they are filtered before being discharged into the atmosphere.

Cooling of the extremely hot gases within cooling chamber 18 is accomplished by cooling apparatus that includes at least one, and preferably a plurality, of cooling assemblies 22. Except for one of the assemblies being longer than the others, each assembly 22 is of the construction best shown in FIG. 4 of the drawings. Such assembly extends through the removable cover 23 of one of a plurality of coplanar access ports 18' that are spaced about the circumference of, and that extend radially through, the outer wall of an upper venturi-like section 24 of chamber 18. The assembly includes an air atomizing spray nozzle 26 for during operation of the apparatus downwardly discharging air atomized cooling water into chamber 18 in a generally conical spray pattern 28. Each spray nozzle 26 has a water inlet 30 and an air inlet 32. Assembly 22 further includes an outer conduit 34 that extends generally radially through an associated one of the covers 23 and access ports 18' of chamber 18 and interconnects spray nozzle water inlet 30 and a source 38 of cooling water. An inner conduit 40 extends through outer conduit 34 and is in generally concentric radially spaced relationship therewith. Conduit 40 interconnects air inlet 32 of spray nozzle 26 with a suitable source of compressed air 42. The water passing from source 38 to nozzle 24 engages and cools not only conduit 34, but also inner conduit 40, and thus reduces heat-induced deterioration of each assembly 22.

To further increase the useful life of each assembly 22, its outer conduit 34 preferably has a flexible bellows-like section 44 disposed between and interconnecting thereto adjacent rigid sections of such conduit. Section 34 permits thermally induced expansive and contractive movement of its rigid sections to occur freely and at different rates, and thus helps prevent premature failure of the rigid sections and particularly the one that extends into the interior of cooling chamber 18. Flexible section 44 of outer conduit 34 is outside of cooling chamber 18 and illustratively is formed of rubber. Opposite ends of section 44 are respectively secured to thereto adjacent ones of the rigid sections of conduit 34 by a clamping assembly 46. Each clamping assembly 46 includes a first annular clamping member 48 that is integral with or fixedly secured to conduit 34, and further includes a second annular clamping member 50 that is releasably connected to member 48 by conventional fasteners 52 of the threaded nut and bolt type. Instead of rubber, the flexible section 44 of outer conduit 34 might be made of suitable plastic, metal or other material.

As is best shown in FIG. 2 of the drawings, the spray nozzles 26 of all but one of the cooling assemblies 22 lie upon the periphery of an imaginary circle concentric with and located close to the inner surface of the outer wall 36 of cooling chamber 20. The spray patterns 28 of these nozzles abut and form a circular array. The spray nozzle 26 of the longer remaining spray assembly 22 is disposed generally centrally of cooling chamber 18, and the spray pattern 28 produced by it preferably and illustratively is closely adjacent those produced by the other spray nozzles 26.

While a preferred embodiment of the invention has been shown and described, this was for purposes of illustration only, and not for purposes of limitation, the scope of the invention being in accordance with the following claims.

That which is claimed is:

1. An air atomizing water nozzle assembly suitable for high temperature applications, comprising
    nozzle means including a water inlet and an air inlet for generating an atomized water spray when water and pressurized air are delivered through said inlets,
    an elongate air delivery line having one end connected to said air inlet of said nozzle means, and an opposite end,
    air inlet means at said opposite end of said air delivery line for admitting pressurized air therein,
    an elongate tubular sleeve coaxially surrounding substantially the full length of said air delivery line and defining an annular water passage therebetween, said sleeve having one end adjacent said one end of said air delivery line, and an opposite end,
    water conduit means communicating with said annular passage adjacent said one end of said tubular sleeve and with said water inlet of said nozzle means, and
    water inlet means communicating with said annular passage adjacent said opposite end of said tubular sleeve for permitting the entry of water into said annular passage and so that the water may flow through said annular passage and said water conduit means to said water inlet of said nozzle means and thereby cool said tubular sleeve and said air conduit line before passing through said nozzle means.

2. The water nozzle assembly as defined in claim 1 wherein said tubular sleeve comprises spaced substantially rigid sections and a flexible section interconnecting said rigid sections, and such that said flexible section surrounds a portion of the length of said air delivery line and accommodates thermally induced expansive and contractive movements of said rigid sections.

3. The water nozzle assembly as defined in claim 2 wherein said flexible section has a bellows like configuration, and is formed of an elastomeric material.

4. A quench tank for cooling a high temperature airstream and comprising
    an elongate housing having a generally cylindrical outer wall, and an air inlet end and an opposite air outlet end for permitting an airstream to pass therethrough,
    at least one air atomizing water nozzle assembly extending radially through said outer wall of said housing, with each of said nozzle assemblies comprising
    (a) nozzle means disposed in said housing and including a water inlet and an air inlet for generating an atomized water spray when water and pressurized air are delivered through said inlets,
    (b) an elongate air delivery line having one end connected to said air inlet of said nozzle means, and an opposite end on the outside of said housing,
    (c) air inlet means at said opposite end of said air delivery line for admitting pressurized air therein,
    (d) an elongate tubular sleeve coaxially surrounding substantially the full length of said air delivery line and defining an annular water passage therebetween, said sleeve having one end adjacent said one end of said air delivery line, and an opposite end on the outside of said housing,
    (e) water conduit means communicating with said annular passage adjacent said one end of said tubular sleeve and with said water inlet of said nozzle means, and
    (f) water inlet means communicating with said annular passage adjacent said opposite end of said tubular sleeve for permitting the entry of water into said annular passage and so that the water may flow through said annular passage and said water conduit means to said water inlet of said nozzle means and thereby cool said tubular sleeve and said air conduit line before passing through said nozzle means.

5. The quench tank as defined in claim 4 wherein a plurality of said nozzle assemblies extend radially through said outer wall in a circumferentially spaced apart arrangement.

6. The quench tank as defined in claim 5 wherein said plurality of nozzle assemblies include a plurality of nozzle means which are spaced a uniform distance from said outer wall in a circular array, and at least one additional nozzle means disposed inside said circular array.

7. The quench tank as defined in claim 6 wherein said plurality of nozzle assemblies each discharge a generally conical spray pattern, and said nozzles assemblies are disposed so that said spray patterns are closely adjacent to each other and substantially cover the entire cross sectional area of said housing.

8. The quench tank as defined in clam 4 wherein said housing includes a plurality of access ports each having a removable cover, and wherein said nozzle assemblies extend through respective ones of said covers.

9. The quench tank as defined in claim 4 wherein said tubular sleeve of each of said nozzle assembles comprises spaced substantially rigid sections and a flexible section interconnecting said rigid sections, and wherein said flexible section is located outside said outer wall of said housing and surrounds a portion of the length of said air delivery line, and such that said flexible section accommodates thermally induced expansive and contractive movements of said rigid sections.

10. The quench tank as defined in claim 9 wherein said flexible section has a bellows like configuration, and is formed of an elastomeric material.

11. The quench tank as defined in claim 10 wherein said housing is vertically disposed, with said inlet end thereof being disposed above said outlet end, and wherein said housing includes a Venturi-like restriction immediately above each of said nozzle assemblies.

* * * * *